United States Patent
Turley et al.

(10) Patent No.: US 7,708,127 B2
(45) Date of Patent: May 4, 2010

(54) FLUID MODEL CONTROL OF ELECTRO-VISCOUS FAN CLUTCH

(75) Inventors: Michael A. Turley, Dexter, MI (US); James A. Lasecki, Farmington Hills, MI (US); Timothy P. Worthley, Oakland Township, MI (US); Michael J. Melaragni, Rochester, MI (US); Jeffrey A. Bozeman, Rochester, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 527 days.

(21) Appl. No.: 11/671,928

(22) Filed: Feb. 6, 2007

(65) Prior Publication Data

US 2008/0185254 A1 Aug. 7, 2008

(51) Int. Cl.
*F16D 31/00* (2006.01)
*B60W 10/02* (2006.01)
*G06F 7/00* (2006.01)
*G06F 17/00* (2006.01)

(52) U.S. Cl. .................. 192/58.4; 192/58.6; 192/58.62; 192/58.63; 192/58.7; 477/175; 477/180; 701/67; 416/169 A

(58) Field of Classification Search ................. 192/58.4, 192/58.6, 58.62, 58.7, 58.8, 58.61, 103 R, 192/103 F; 477/174; 123/41, 11, 49; 416/169 A; 701/67
See application file for complete search history.

(56) References Cited

U.S. PATENT DOCUMENTS

| 5,224,446 | A | * | 7/1993 | Okita et al. | 123/41.12 |
| 5,584,371 | A | * | 12/1996 | Kelledes et al. | 192/58.61 |
| 6,079,536 | A | * | 6/2000 | Hummel et al. | 192/58.62 |

* cited by examiner

*Primary Examiner*—Tisha D Lewis

(57) ABSTRACT

Accordingly, a control system for controlling a viscous clutch of a fan is provided. The control system includes a delta speed module that determines one of an over speed condition, an under speed condition, and a steady state condition based on a desired fan speed and an actual fan speed. A mode module determines a mode of the clutch based on the one of the over-speed condition, the under-speed condition, and the steady state condition, wherein the mode is one of a pump in mode, a pump out mode, and a closed loop mode. A valve control module that controls an operational state of the clutch valve based on the mode.

21 Claims, 5 Drawing Sheets

FLUID MODEL CONTROL OF ELECTRO-VISCOUS FAN CLUTCH

FIELD

The present disclosure relates to methods and systems for controlling an electro-viscous fan clutch.

BACKGROUND

The statements in this section merely provide background information related to the present disclosure and may not constitute prior art.

Today's internal combustion engines generate a tremendous amount of heat. This heat is created when an air and fuel mixture is ignited inside the engine combustion chamber. To prevent overheating of cylinder walls, pistons, valves, and other engine components, it is necessary to dispose of the heat. Fan systems deliver air to the engine to maintain proper temperatures during engine operation.

Rear-wheel-drive vehicles with longitudinally mounted engines typically include an engine-driven cooling fan. Engine-driven cooling fans include a fan and a viscous clutch. The fan is generally located at the front of the water pump and is driven by a belt and pulley system connected to the crankshaft of the engine. The viscous clutch is positioned at the hub of the fan. The viscous clutch operates to engage and disengage the fan from the engine. When the engine is cool, or even at normal operating temperatures, the fan clutch partially disengages the fan. Disengaging the fan saves power since the engine does not have to fully drive the fan.

SUMMARY

Accordingly, a control system for controlling a viscous clutch of a fan is provided. The control system includes a delta speed module that determines one of an over speed condition, an under speed condition, and a steady state condition based on a desired fan speed and an actual fan speed. A mode module determines a mode of the clutch based on the one of the over-speed condition, the under-speed condition, and the steady state condition, wherein the mode is one of a pump in mode, a pump out mode, and a closed loop mode. A valve control module that controls an operational state of the clutch valve based on the mode.

In other features, a method of controlling a viscous clutch of a fan coupled to an engine is provided. The method includes: computing a difference between a desired fan speed and an actual fan speed; determining one of an over speed condition, an under speed condition, and a steady state condition from the difference; determining at least one of a pump in mode, a pump out mode, and a closed loop mode of the clutch based on the condition; controlling a state of a clutch valve of the viscous clutch based on the at least one of the pump in mode, the pump out mode, and the closed loop mode; and determining a fluid amount in the clutch based on the at least one of the pump in mode, the pump out mode, and the closed loop mode.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
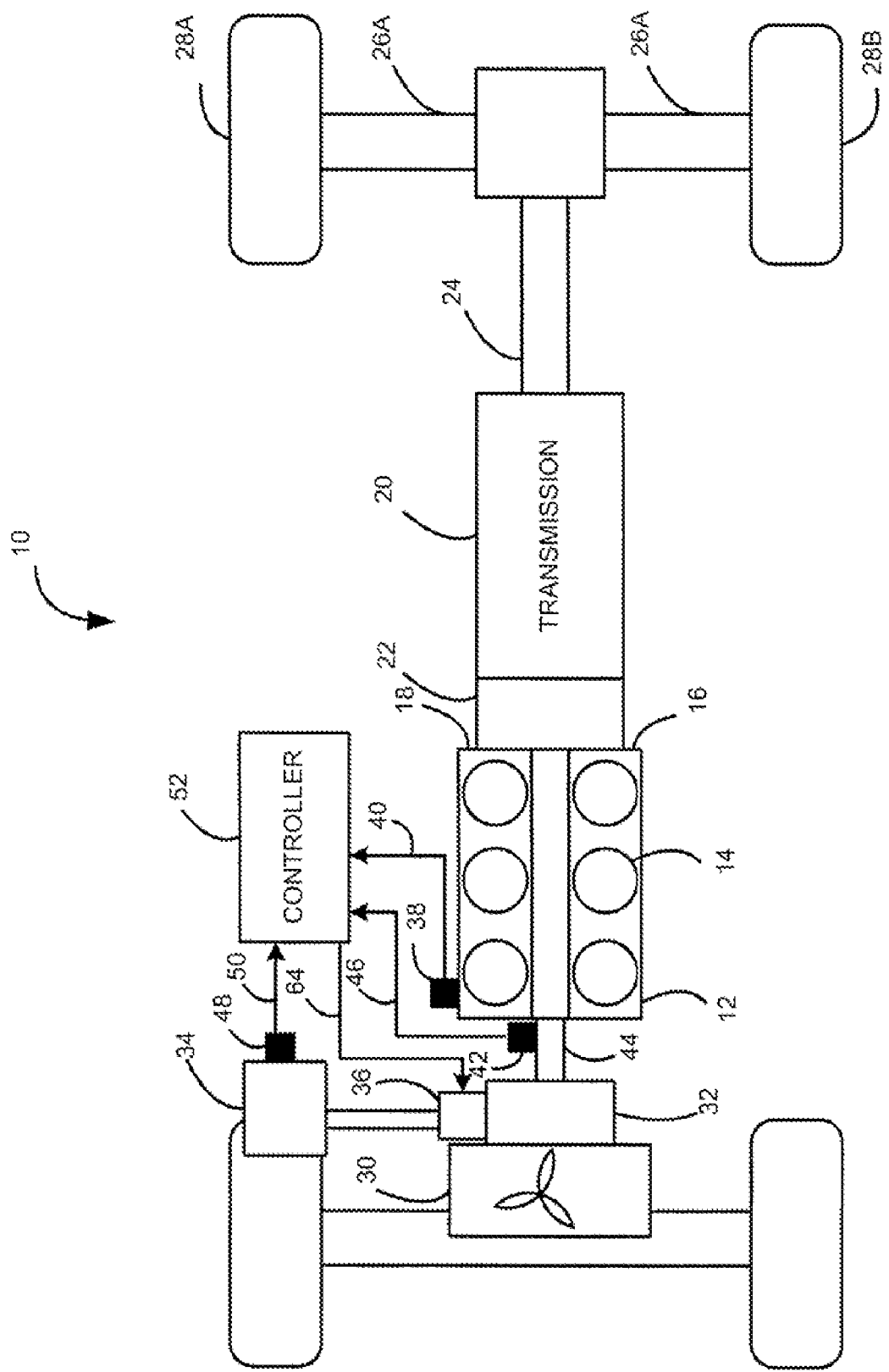
FIG. 1 is a functional block diagram illustrating a rear-wheel-drive vehicle including an electro-viscous fan system.

The following description of the various embodiments is merely exemplary in nature and is in no way intended to limit the present disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a rear-wheel-drive vehicle is shown generally at 10. An engine 12 combusts an air and fuel mixture within cylinders 14 to produce drive torque. The exemplary engine 12 includes six cylinders 14 configured in adjacent cylinder banks 16 and 18 in a V-type layout. Although six cylinders (N=6) are depicted, it is appreciated that the engine 12 may include additional or fewer cylinders 14. For example, engines having 2, 4, 5, 8, 10, 12 and 16 cylinders are contemplated. It is also appreciated that the engine 12 may, in the alternative, include an inline-type cylinder configuration.

Torque produced by the engine 12 is transmitted to a rear-wheel-drive transmission 20 via a torque converter 22. It is appreciated that the transmission 20 may be either manual or automatic. The transmission 20 can be a freewheel type transmission, a clutch-to-clutch type transmission, or a continuously variable type transmission. The transmission 20 includes a single output shaft that is coupled to a vehicle drive shaft 24. The drive shaft 24 transfers torque from the transmission 20 to axles 26A and 26B and wheels 28A and 28B at the rear of the vehicle 10.

A fan 30 is driven by a belt and pulley system coupled to a crankshaft of the engine 12. The fan 30 acts to cool components of the engine 12. An electro-viscous clutch 32 engages and disengages to couple the fan 30 to the engine 12. Fluid is provided to the clutch 32 from a regulated fluid source 34. The clutch 32 is coupled to the fluid source 34 via a clutch valve 36. The clutch valve 36 controls the flow of fluid to the clutch 32.

An engine speed sensor 38 senses the rotational speed of the engine 12 and generates an engine speed signal 40. A clutch output speed sensor 42 senses the rotational speed of the output shaft 44 and generates an output speed signal 46. A fluid temperature sensor senses the temperature of the fluid and generates a fluid temperature signal 50. The controller 52 receives the engine speed signal 40, the output speed signal 46, and the fluid temperature signal 50 and controls the clutch valve 36 to supply and/or discharge fluid to/from the clutch 32. In various embodiments, a fluid temperature model within the controller 52 provides an estimated fluid temperature (alternative to the fluid temperature signal 50).

Figure 2:
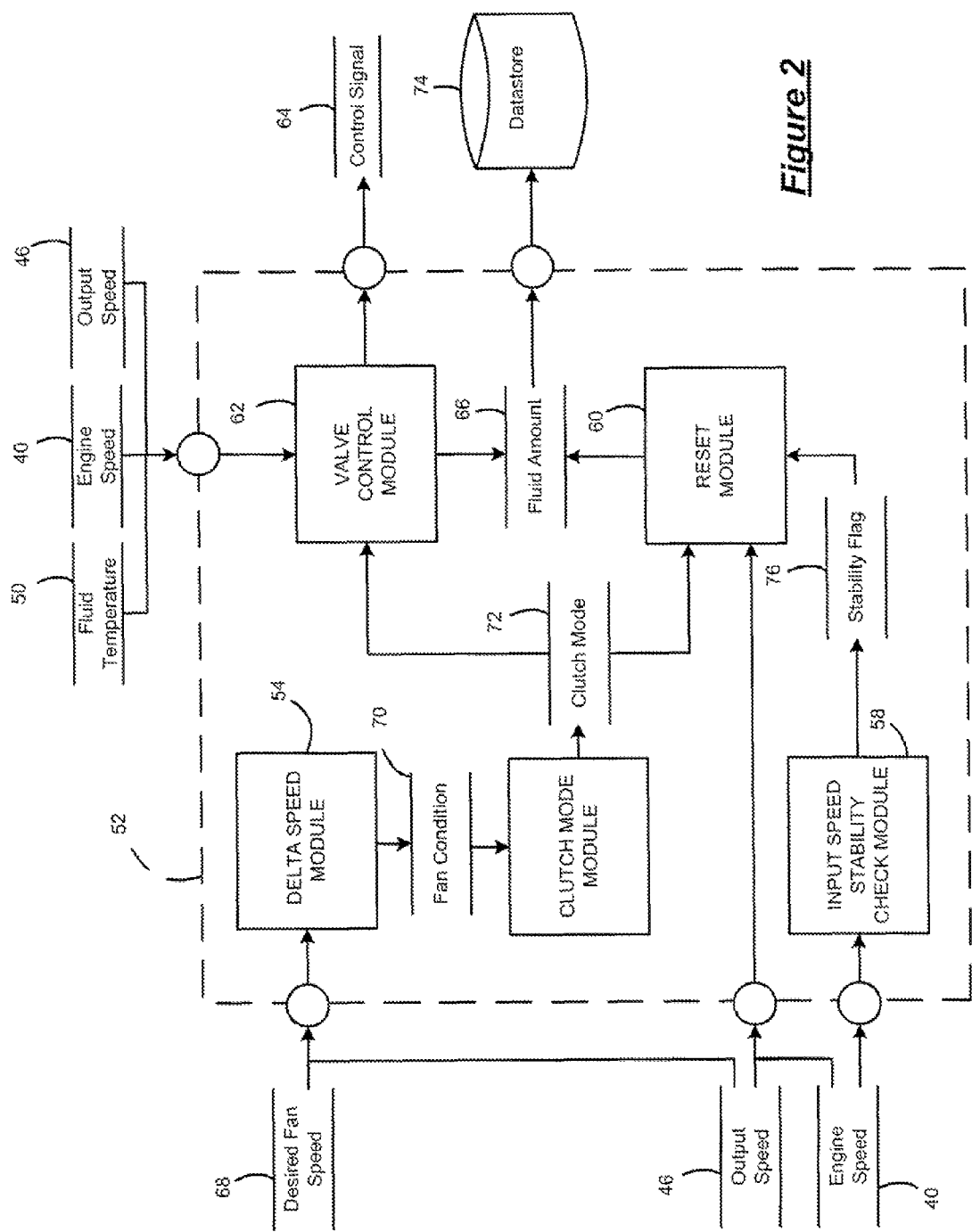
FIG. 2 is a dataflow diagram illustrating a viscous clutch control system.

Referring to FIG. 2, a dataflow diagram illustrates a viscous clutch control system. Various embodiments of viscous clutch control systems according to the present disclosure may include any number of sub-modules embedded within the controller 52. The sub-modules shown may be combined and/or further partitioned to provide similar control of the clutch valve 36. In various embodiments, the controller 52 of FIG. 2 includes a delta speed module 54, a clutch mode module 56, an input speed stability check module 58, a reset module 60, and a valve control module 62. The delta speed module 54, the clutch mode module 56, and the valve control module 62 determine a control signal 64 to be sent to the clutch valve 36 (FIG. 1) and determine a fluid amount 66 in a working chamber of the clutch 32 (FIG. 1). The input speed stability check module 58 and the reset module 60 periodically reset the fluid amount 66. The fluid amount 66 can be stored in a datastore 74.

More specifically, the delta speed module 54 receives as input a desired fan speed 68 and an output speed signal 46. The output speed represents the actual speed of the fan. It is appreciated that other similar inputs may be used to indicate an actual fan speed. The delta speed module 54 determines a delta speed by subtracting the output speed 46 from the desired fan speed 68. A fan speed condition 70 is determined from the delta speed. If the delta speed is greater than a maximum, then an over speed condition exists. If the delta speed is less than a minimum, then an under speed condition exists. Otherwise the fan condition indicates that the fan is operating within tolerance of the current operating conditions.

The clutch mode module 56 receives as input the fan condition 70 and determines a clutch mode 72 based on the fan condition 70. The clutch mode 72 can be at least one of a pump out mode, a pump in mode, and a closed loop mode. The state of the clutch is set to the pump out mode when over speed conditions exist. The state of the clutch is set to the pump in mode when under speed conditions exist. The clutch is set to the closed loop mode when the fan condition indicates that the clutch is operating within tolerance.

The valve control module 62 receives the clutch mode 72. Based on the clutch mode 72, the valve control module 62 sets the valve control signal 64 to a predetermined duty cycle. If the clutch mode 72 is equal to the pump out mode, the valve control signal 64 is set to command the valve closed to decrease fan speed or combat saturation. The saturation point is determined based on an input speed of the clutch, and is representative of the amount of fluid in working chamber of the clutch that would constitute an "overfilled" condition. If the clutch mode 72 is equal to the pump in mode, the valve control signal 64 is set to command the valve to fully open to allow fluid to flow into the clutch to increase fan speed. The control signal commands the clutch to fully open until the clutch is operating within tolerance. If the clutch mode 72 is equal to the closed loop mode, the valve control signal 64 is set to modulate so that position is maintained.

The valve control module 62 also receives as input a fluid temperature signal 50, an output speed signal 46, and an engine speed signal 40. The valve control module 62 determines a fluid amount 66 in the clutch from a profile that corresponds to the clutch mode 72. The profile may be at least one of a pump in profile and a pump out profile. The profiles are based on at least one of fluid temperature 50, output speed 46 and engine speed 40. The pump in profile defines how fluid flows into the working chamber of the clutch. The pump out profile defines how the fluid flows out of the working chamber of the clutch. When the clutch mode is equal to the closed loop mode, the fluid amount can be determined by using the reset module 60 to periodically reset the fluid level based on current operating conditions.

It is desirable to reset the determined fluid amount 66 periodically to improve the accuracy of the fluid amount 66 while the clutch mode 72 is equal to the closed loop mode. The fluid amount 66 is reset based on a steady state profile. The steady state profile defines the amount of fluid in the clutch relative to the current operating conditions. The steady state profile is based on the input speed and the output speed 46. The input speed may be calculated from engine speed 40 and a water pump pulley ratio where the engine speed 40 is multiplied by the ratio.

The fluid amount 66 can be periodically reset when the input speed is stable. The input speed stability check module 58 and the reset module 60 determine whether the input speed is stable and resets the fluid amount 66. More specifically, the input speed stability check module 58 receives as input the engine speed signal 40. Since the input speed is equal to engine speed 40 times a water pump pulley ratio, and the ratio remains constant, the engine speed can be evaluated. The input speed stability check module 58 determines whether the input speed is stable by evaluating the engine speed signal 40 to determine if a change has occurred. If a significant change in engine speed 40 has occurred, the input speed is not stable and a speed stability flag 76 is set to FALSE. If the engine speed remains relatively constant, the speed stability flag 76 is set to TRUE.

The reset module 60 receives as input the stability flag 76 and the clutch mode 72. The reset module 60 resets the fluid amount 66 when the input speed is stable and the clutch is operating in the closed loop mode. In various embodiments, the fluid amount 66 is reset just after the input speed becomes stable and periodically thereafter. The fluid amount 66 can be stored in a datastore 74 containing non-volatile memory. Non-volatile memory allows the fluid amount 66 to remain saved in memory when power is removed from the controller 52, such as during a key cycle of the vehicle 10. This allows the fluid amount 66 to be known at the start of each key cycle.

Figure 3:
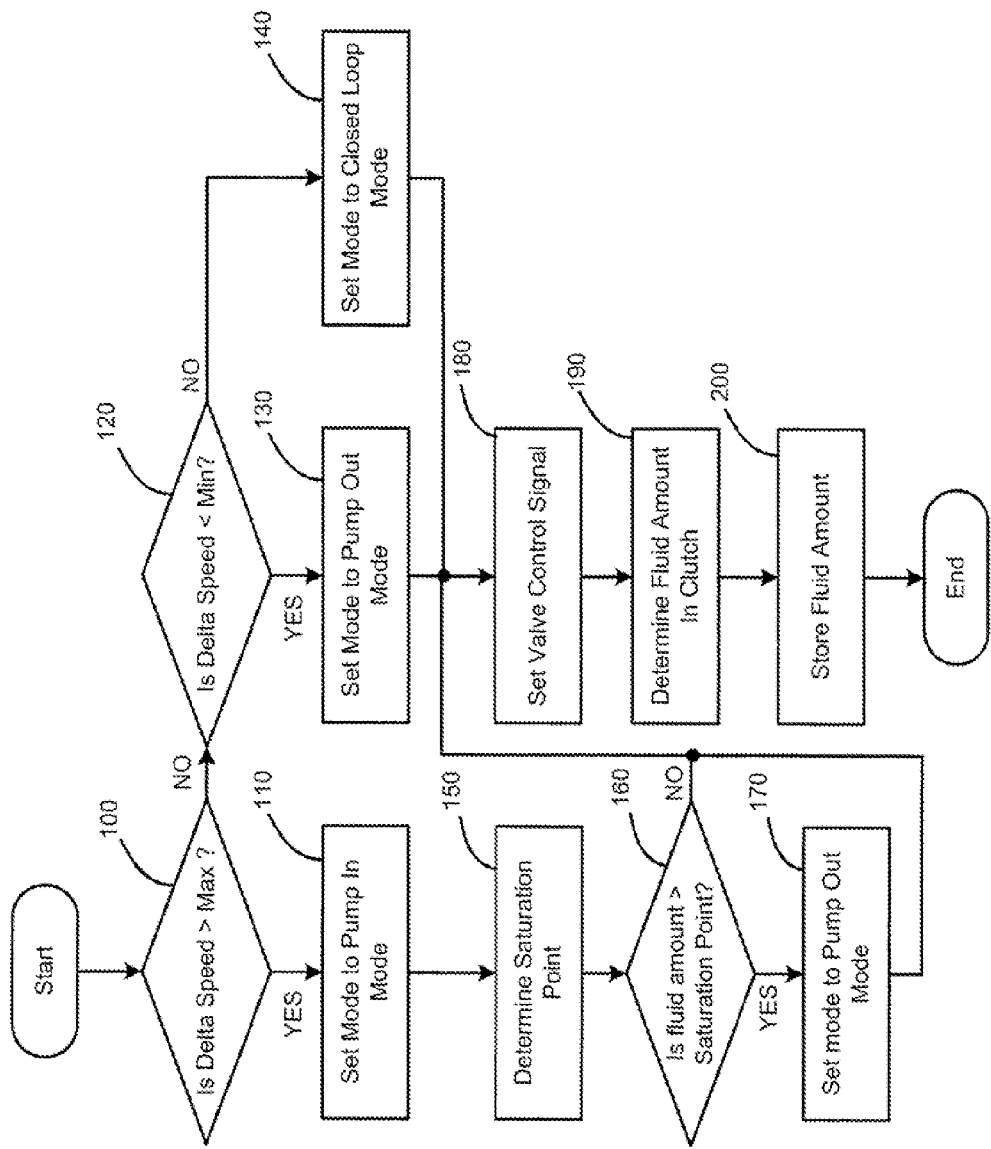
FIG. 3 is a flowchart illustrating a method to determine the fluid amount in the viscous clutch and to control the clutch valve.

Referring now to FIG. 3, a flowchart illustrates exemplary methods performed by the clutch mode module 56 and the valve control module 62. The method may be continually performed during engine operation. In various embodiments, the method may be scheduled to run every half second. In FIG. 3, if the delta speed is greater than a maximum threshold at 100, the clutch mode is set to pump in mode at 110. If the delta speed is less than a minimum threshold at 120, the clutch mode is set to the pump out mode at 130. Otherwise the clutch mode is set to the closed loop mode at 140. If the mode is set equal to the pump in mode, a saturation point is determined for the current input speed at 150. If the current fluid amount is greater than the saturation point at 160, the clutch mode is set back to the pump out mode at 170. Otherwise the clutch mode remains at the pump in mode. Once the clutch mode is determined, a valve control signal is set at 180. The control signal can be a pulse width modulated signal that controls the clutch valve to a fully closed position at zero percent duty cycle, to a fully open position at one hundred percent duty cycle, and somewhere between when the duty cycle is modulated.

A fluid amount is determined at 190 based on the pump in profile and the pump out profile. The pump in profile is based on the output speed. In an exemplary embodiment, the pump in profile may be implemented as a predefined two dimensional lookup table with output speed as the index and fluid volume as the output. The fluid amount is set equal to the fluid volume (or, more specifically, change in fluid volume) plus the current fluid amount. The pump out profile is based on the fluid temperature and a difference between an input speed and the output speed. The input speed may be calculated from engine speed and a water pump pulley ratio where the engine speed is multiplied by the ratio. In an exemplary embodiment, the pump out profile may be implemented as a predefined three dimensional lookup table with the difference and the fluid temperature as indices and fluid volume as the output. The fluid amount is set equal to the current fluid amount minus the fluid volume (or, more specifically, change in fluid amount). The fluid amount is stored in memory at 200.

Figure 4:
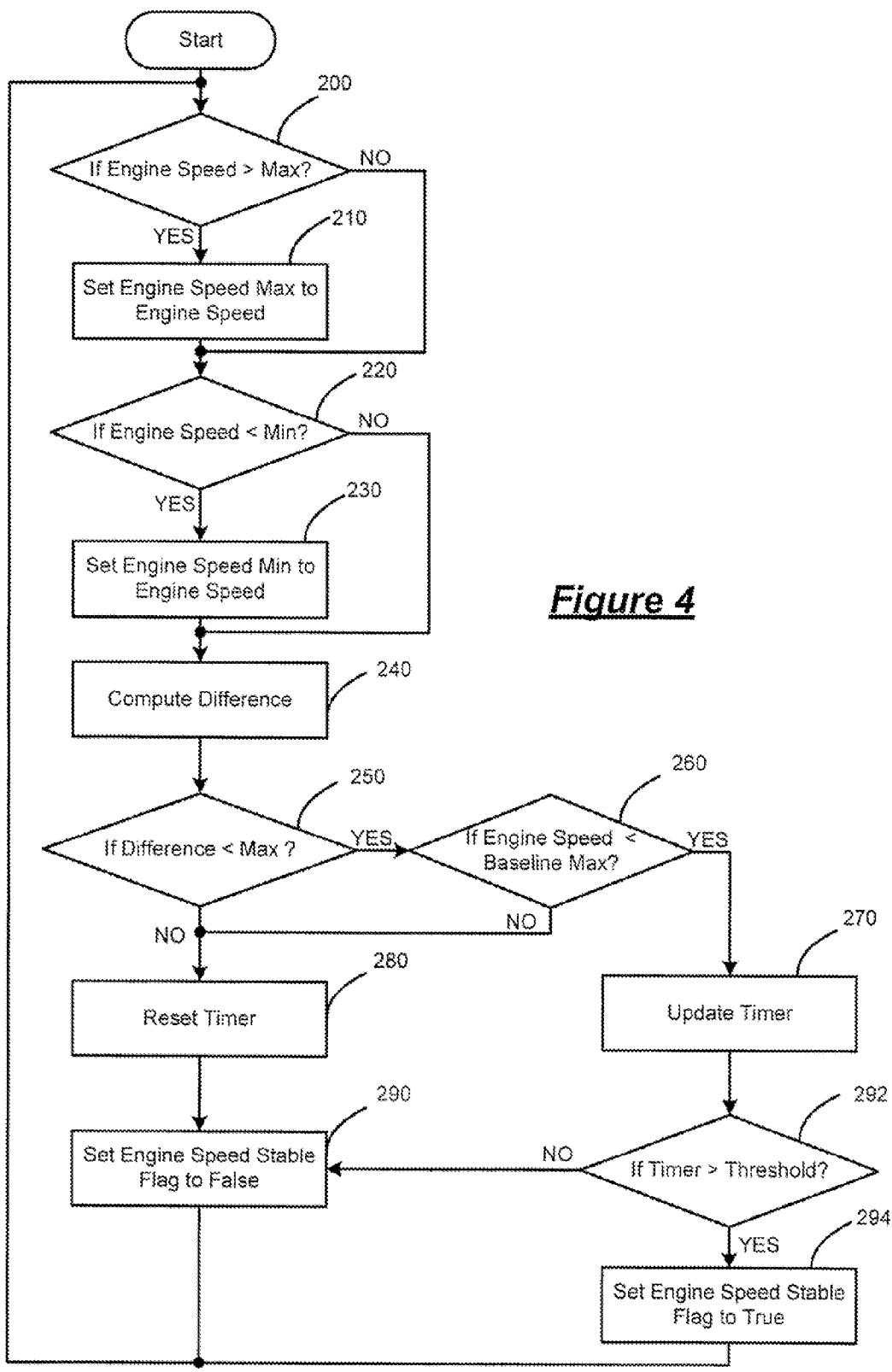
FIG. 4 is a flowchart illustrating a method to determine whether the clutch input speed is stable.

Referring now to FIG. 4, a flowchart illustrates an exemplary input speed stability check method performed by the input speed stability check module 58. The method may be continually performed during engine operation. In various embodiments, the method may be scheduled to run every half second. In FIG. 4, if the engine speed is greater than a maximum threshold at 210, an engine speed maximum is set to the engine speed at 220. If the engine speed is less than a minimum threshold, an engine speed minimum is set to the engine speed at 230. A difference between the engine speed maximum and the engine speed minimum is computed at 240. If the difference is less than a maximum threshold at 250 and the engine speed is less than a maximum threshold at 260, a timer is updated at 270. Otherwise the timer is reset at 280 and the stability flag is set to FALSE at 290. If after updating the timer at 270, the timer is greater than a threshold at 292, the stability flag is set to TRUE at 294. Otherwise the stability flag is set to FALSE at 290.

Figure 5:
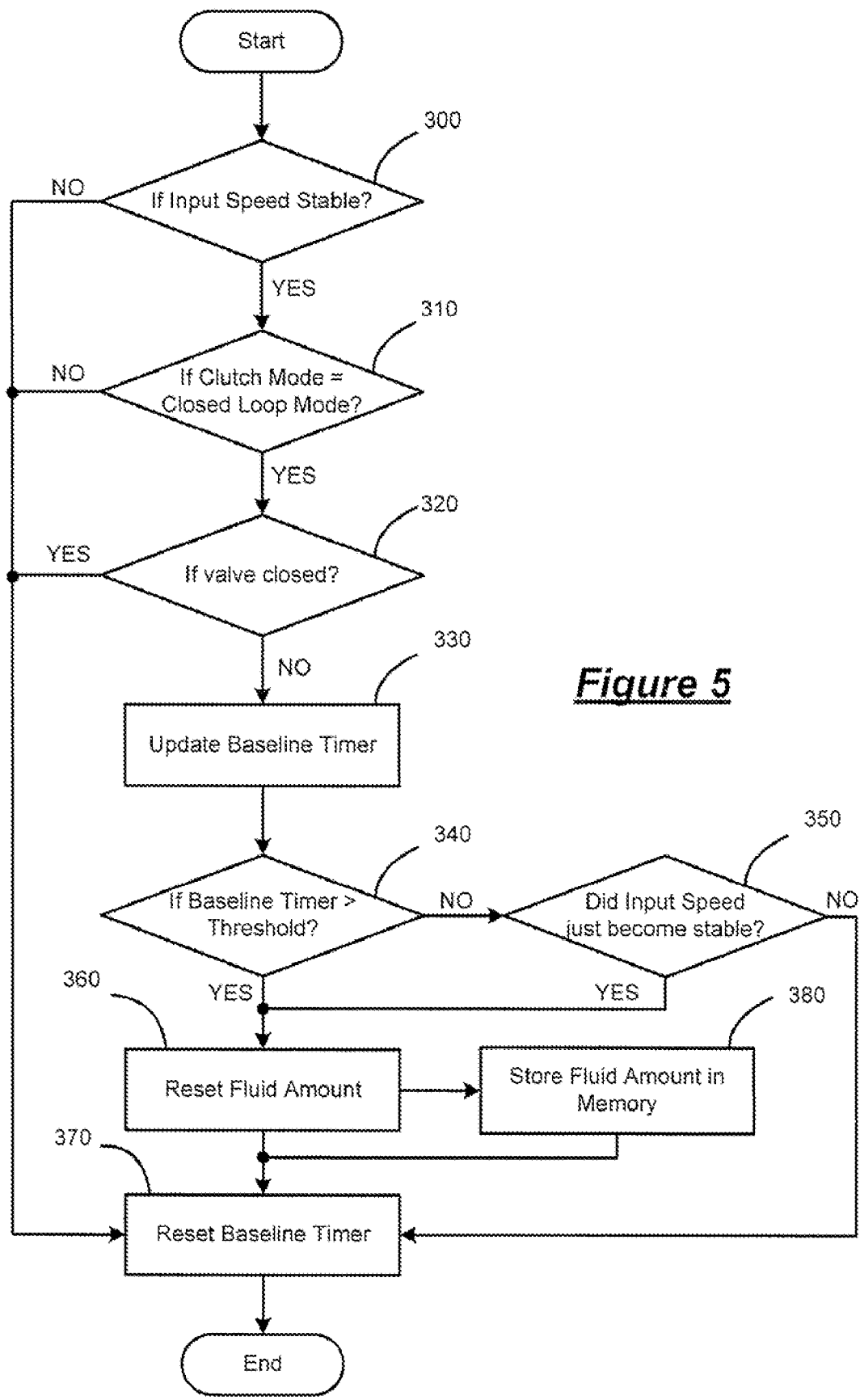
FIG. 5 is a flowchart illustrating a method to reset the fluid amount.

Referring now to FIG. 5, a flowchart illustrates an exemplary reset method performed by the reset module 60. The method may be continually performed during engine operation. In various embodiments, the method may be scheduled to run every half second. In FIG. 5, if the input speed is stable at 300, the clutch mode equals the closed loop mode at 310, and the valve is not controlled to close at 320, a baseline timer is updated at 330. Otherwise the baseline timer is reset at 370. If after the baseline timer is updated the timer is greater than a threshold at 340 or the input speed just became stable at 350, the fluid amount is reset at 360. The fluid amount is reset based on a steady state profile. In an exemplary embodiment, the steady state profile may be implemented as a predefined three dimensional lookup table with the input speed and the output speed as indices and fluid volume as the output. The fluid amount is set equal to the fluid volume. The fluid amount is stored in memory at 380 and the baseline timer is reset at 370.

It is appreciated that all comparisons made in various embodiments of FIGS. 3, 4, and 5 can be implemented in various forms depending on the selected values for the minimums, the maximums, and the threshold values. For example, a comparison of "greater than" may be implemented as "greater than or equal to" in various embodiments. Similarly, a comparison of "less than" may be implemented as "less than or equal to" in various embodiments.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A control system for controlling a clutch valve of a viscous clutch fan system comprising:
   a delta speed module that determines one of an over speed condition, an under speed condition, and a steady state condition based on a desired fan speed and an actual fan speed;
   a mode module that determines a mode of the clutch based on the one of the over-speed condition, the under-speed condition, and the steady state condition, wherein the mode is one of a pump in mode, a pump out mode, and a closed loop mode; and
   a valve control module that controls an operational state of the clutch valve based on the mode, and that determines a fluid amount in the clutch based on the mode.

2. The system of claim 1 wherein the delta speed module determines a difference between the actual fan speed and the desired fan speed and determines the one of the over speed condition, the under speed condition, and the steady state condition based on the difference.

3. The system of claim 2 wherein if the difference is greater than a maximum value then the over speed condition exists, if the difference is less than a minimum value then the under speed condition exists, otherwise the steady state condition exists.

4. The system of claim 1 wherein the valve control module determines the fluid amount in the clutch based on the mode and one of a pump in profile and a pump out profile and wherein the pump in profile and the pump out profile correspond to the pump in mode and the pump out mode respectively.

5. The system of claim 1 wherein the actual fan speed is equal to an output speed and wherein the output speed is based on a speed of an output shaft extending from the clutch.

6. The system of claim 4 wherein the pump in profile defines how fluid flows into the working chamber of the viscous clutch and is based on an output speed.

7. The system of claim 4 wherein the pump out profile defines how the fluid flows out of the working chamber of the clutch and is based on a fluid temperature and a difference between an input speed and an output speed.

8. The system of claim 7 wherein the input speed is computed by multiplying engine speed by a ratio and wherein the output speed is based on a speed of an output shaft extending from the clutch.

9. The system of claim 4 further comprising a reset module that periodically resets the fluid amount when the mode is equal to the closed loop mode.

10. The system of claim 9 wherein the reset module resets the fluid amount based on a steady state profile and wherein the steady state profile defines the amount of fluid in the clutch relative to current operating conditions and is based on an input speed and an output speed.

11. The system of claim 10 wherein the input speed is computed by multiplying engine speed by a ratio and the output speed is received from a speed sensor mounted to an output shaft of the clutch.

12. The system of claim 9 further comprising an input speed stability check module that determines whether an input speed is stable and wherein the reset module periodically resets the fluid amount when the input speed is stable.

13. The system of claim 9 wherein the reset module resets the fluid amount just after an input speed becomes stable and the mode is equal to the closed loop mode.

14. The system of claim 1 wherein the valve control module determines a saturation point and controls the operational state of the clutch based on the saturation point wherein the saturation point is based on an input speed of the clutch.

15. A method of controlling a viscous clutch of a fan coupled to an engine comprising:
- computing a difference between a desired fan speed and an actual fan speed;
- determining one of an over speed condition, an under speed condition, and a steady state condition from the difference;
- determining at least one of a pump in mode, a pump out mode, and a closed loop mode of the clutch based on the condition;
- controlling a state of a clutch valve of the viscous clutch based on the at least one of the pump in mode, the pump out mode, and the closed loop mode; and
- determining a fluid amount in the clutch based on the at least one of the pump in mode, the pump out mode, and the closed loop mode.

16. The method of claim 15 wherein determining the fluid amount is based on at least one of a pump in profile that defines how fluid flows into the clutch, a pump out profile that defines how fluid flows out of the clutch, and a steady state profile that defines the amount of fluid in the clutch relative to current operating conditions.

17. The method of claim 16 further comprising:
- receiving an output speed signal from a speed sensor mounted to an output shaft of the clutch; and
- defining the pump in profile based on the output speed signal.

18. The method of claim 16 further comprising:
- receiving an output speed signal from a speed sensor mounted to an output shaft of the clutch;
- receiving a fluid temperature signal from a temperature sub-module;
- receiving an engine speed signal from an engine speed sensor mounted to the engine;
- computing an input speed by multiplying an engine speed by a ratio;
- computing a difference between the input speed and the output speed signal; and
- defining the pump out profile based on a fluid temperature signal and the difference between the input speed and the output speed signal.

19. The method of claim 16 further comprising:
- receiving an output speed from a speed sensor mounted to an output shaft of the fan;
- computing an input speed by multiplying an engine speed by a ratio; and
- defining the steady state profile based on the input speed and the output speed.

20. The method of claim 19 further comprising periodically resetting the fluid amount when the mode is equal to the closed loop mode based on the steady state profile.

21. The method of claim 15 further comprising determining when an input speed is stable and resetting the fluid amount when the mode is equal to the closed loop mode and the input speed is stable.

* * * * *